(12) United States Patent
Chen et al.

(10) Patent No.: US 10,951,440 B2
(45) Date of Patent: Mar. 16, 2021

(54) METHOD FOR UPLINK DATA TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/712,924

(22) Filed: Dec. 12, 2019

(65) Prior Publication Data

US 2020/0119953 A1 Apr. 16, 2020

Related U.S. Application Data

(63) Continuation of application No. PCT/CN2017/119309, filed on Dec. 28, 2017.

(51) Int. Cl.
*H04L 25/02* (2006.01)
*H04B 7/0456* (2017.01)
(Continued)

(52) U.S. Cl.
CPC ....... *H04L 25/0226* (2013.01); *H04B 7/0456* (2013.01); *H04B 7/0639* (2013.01);
(Continued)

(58) Field of Classification Search
CPC ............ H04L 25/0226; H04B 7/0486; H04W 72/042
See application file for complete search history.

(56) References Cited

U.S. PATENT DOCUMENTS

2012/0202558 A1 8/2012 Hedberg et al.
2013/0229989 A1 9/2013 Natarajan et al.
(Continued)

FOREIGN PATENT DOCUMENTS

CN 102469609 5/2012
CN 102595514 7/2012
(Continued)

OTHER PUBLICATIONS

3GPP TSG RAN WG1 91; R1-1720283; Reno, USA, Nov. 27-Dec. 1, 2017.
(Continued)

*Primary Examiner* — Mansour Oveissi

(57) ABSTRACT

A method for uplink data transmission, a terminal device and a network device are provided. The method may include: receiving subset constraint indication information of an SRS resource sent by a network device, wherein the subset constraint indication information is used for indicating at least one available SRS resource subset; according to the subset constraint indication information, determining the length of an SRI, sent by the network device, in DCI for scheduling uplink data transmission; according to the length of the SRI, determining a target SRI from the DCI; determining, in the at least one available SRS resource subset, a target SRS resource subset corresponding to the target SRI; and according to the target SRS resource subset, determining a transmission parameter used for the uplink data transmission.

14 Claims, 4 Drawing Sheets

(51) Int. Cl.
  *H04B 7/06* (2006.01)
  *H04L 5/00* (2006.01)
  *H04W 72/04* (2009.01)
(52) U.S. Cl.
  CPC ......... *H04L 5/0051* (2013.01); *H04W 72/042* (2013.01); *H04W 72/046* (2013.01)

(56) References Cited

U.S. PATENT DOCUMENTS

| | | |
|---|---|---|
| 2013/0294381 A1 | 11/2013 | Wang et al. |
| 2016/0219534 A1 | 7/2016 | Hao et al. |
| 2017/0223675 A1 | 8/2017 | Dinan et al. |
| 2019/0103949 A1* | 4/2019 | Harrison ............... H04L 5/0091 |
| 2019/0222277 A1* | 7/2019 | Park ......................... H04B 7/06 |

FOREIGN PATENT DOCUMENTS

| | | |
|---|---|---|
| CN | 103036663 A | 4/2013 |
| WO | 2016036158 A1 | 3/2016 |

OTHER PUBLICATIONS

3GPP TSG RAN WG1 #91 Meeting; R1-1721400; Summary of issues on UL non-codebook based transmission; Reno USA, Nov. 27-Dec. 1, 2017; pp. 1-11.
3GPP TSG-RAN WG1 #91; R1-1720739; Non-codebook based UL MIMO remaining details; Reno, USA, Nov. 27-Dec. 1, 2017; pp. 1-6.
3GPP TSG RAN WG1 Meeting #91; R1-1719431; Remaining details of non-codebook based transmission for UL MIMO; Reno, USA, Nov. 27-Dec. 1, 2017; pp. 1-4.
Extended European Search Report for European Application No. 17935941.9 dated Jul. 13, 2020.
China First Office Action with English Translation for CN Application 202010081182.5 dated Nov. 4, 2020.
3GPP TSG RAN WG1 Meeting 90bis; Prague, CZ, gth-13th, Oct. 2017; R1-1718426.

* cited by examiner

METHOD FOR UPLINK DATA TRANSMISSION, TERMINAL DEVICE AND NETWORK DEVICE

CROSS-REFERENCE TO RELATED APPLICATION(S)

This application is a continuation application of International Application No. PCT/CN2017/119309, filed on Dec. 28, 2017, the entire disclosure of which is hereby incorporated by reference.

TECHNICAL FIELD

The present disclosure relates to the field of communication, in particular to a method for uplink data transmission, a terminal device, and a network device.

BACKGROUND

In a new radio (NR) system, a terminal device may use a plurality of panels for uplink data transmission, one panel contains a group of physical antennas, and each panel has an independent radio frequency channel. The terminal device may transmit data on the plurality of panels at the same time, but since channel conditions corresponding to different panels are different, different transmission parameters need to be adopted for different panels according to their respective channel information.

In order to acquire these transmission parameters, different channel sounding reference signal (SRS) resources need to be configured for different panels to acquire uplink channel information. For example, one panel may correspond to one SRS resource set, wherein each SRS resource may be used to acquire a transmission parameter of a physical uplink shared channel (PUSCH) transmission on the panel, or to acquire a transmission parameter of a transmission layer on the PUSCH. A network device needs to indicate one or more SRS resources through a SRS Resource Indicator (SRI), and the one or more SRS resources may be used to acquire a transmission parameter of current uplink data transmission.

However, in some application scenarios, some SRS resources or SRI indication states are unavailable, and the network device will not indicate corresponding information for the terminal device, thus wasting some SRI overhead.

SUMMARY

The present disclosure provides a method for uplink data transmission, a terminal device, and a network device.

In a first aspect, there is provided a method for uplink data transmission, the method includes: receiving subset constraint indication information of a sounding reference signal (SRS) resource sent by a network device, wherein the subset constraint indication information is used for indicating at least one available SRS resource subset; determining a length of a SRS resource indicator (SRI) in downlink control information (DCI) sent by the network device for scheduling the uplink data transmission according to the subset constraint indication information; determining a target SRI from the DCI according to the length of the SRI; determining a target SRS resource subset corresponding to the target SRI in the at least one available SRS resource subset; and determining a transmission parameter used for the uplink data transmission according to the target SRS resource subset.

Therefore, in the method for uplink data transmission according to the implementation of the present disclosure, a terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed.

In combination with the first aspect, in one implementation of the first aspect, each SRS resource subset in the at least one available SRS resource subset is one SRS resource.

In combination with the first aspect and the implementation thereof, in another implementation of the first aspect, the method further includes: receiving resource set indication information sent by the network device, wherein the resource set indication information is used for indicating at least one SRS resource set, and the subset constraint indication information is used for indicating at least one available SRS resource in the at least one SRS resource set.

In combination with the first aspect and the implementation thereof, in another implementation of the first aspect, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

In combination with the first aspect and the implementations thereof, in another implementation of the first aspect, each SRS resource subset in the at least one available SRS resource subset is one SRS resource combination, and the one SRS resource combination includes at least one SRS resource.

In combination with the first aspect and the implementations thereof, in another implementation of the first aspect, the method further includes: determining at least one pre-configured SRS resource combination, wherein the subset constraint indication information is used for indicating at least one available SRS resource combination in the at least one SRS resource combination.

Optionally, the determining the at least one pre-configured SRS resource combination includes: receiving resource combination indication information sent by the network device, wherein the resource combination indication information includes the at least one SRS resource combination.

In combination with the first aspect and the implementation thereof, in another implementation of the first aspect, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

In combination with the first aspect and the implementation thereof, in another implementation of the first aspect, the at least one SRS resource combination includes all combinations among SRS resources in one SRS resource set.

In combination with the first aspect and the implementation, in another implementation of the first aspect, the determining the length of the SRI according to the subset constraint indication information includes: determining the length of the SRI according to a quantity of the at least one available SRS resource subset.

In combination with the first aspect and the implementations thereof, in another implementation of the first aspect, the determining the length of the SRI according to the quantity of the at least one available SRS resource subset includes: determining that the length of the SRI is equal to $\lceil \log_2 K \rceil$, wherein $\lceil\ \rceil$ represents upward rounding and K is equal to the quantity of the at least one available SRS resource subset.

In combination with the first aspect and the implementation thereof, in another implementation of the first aspect, the method further includes: determining a corresponding relationship between a value of the SRI and the at least one available SRS resource subset according to the subset constraint indication information; the determining the target SRS resource subset corresponding to the target SRI in the at least one available SRS resource subset, includes: determining the target SRS resource subset corresponding to the target SRI from the at least one available SRS resource subset according to the corresponding relationship between the value of the SRI and the at least one available SRS resource subset.

In combination with the first aspect and the implementation thereof, in another implementation of the first aspect, the transmission parameter used for the uplink data transmission includes at least one of: a precoding matrix, a quantity of transmission layers, a quantity of antenna ports, a transmission beam, a power control parameter, and a panel.

In combination with the first aspect and the implementation, in another implementation of the first aspect, the determining the transmission parameter used for the uplink data transmission according to the target SRS resource subset includes: determining a quantity of antenna ports of the target SRS resource subset and target precoding matrix indicator (PMI) information; and determining a precoding matrix corresponding to the quantity of antenna ports of the target SRS resource subset and the target PMI information as a precoding matrix used for the uplink data transmission according to the corresponding relationship among the quantity of antenna ports, the PMI information, and the precoding matrix.

In combination with the first aspect and the implementation thereof, in another implementation of the first aspect, the DCI includes the target PMI information.

Therefore, the precoding matrix used for uplink data transmission scheduled by the DCI is acquired based on the method, so that data transmission on different panels may adopt independent precoding matrices.

In combination with the first aspect and the implementation thereof, in another implementation of the first aspect, the determining the transmission parameter used for the uplink data transmission according to the target SRS resource subset includes: determining a total quantity of antenna ports of the target SRS resource subset and/or a quantity of SRS resources contained in the target SRS resource subset as a quantity of transmission layers of the uplink data transmission.

Optionally, if the target SRS resource subset is one SRS resource, a quantity of antenna ports of the one SRS resource is determined as a quantity of transmission layers for uplink data transmission.

Optionally, if the target SRS resource subset is one SRS resource combination, a quantity of SRS resources included in the one SRS resource combination is determined as a quantity of transmission layers for uplink data transmission.

In combination with the first aspect and the implementation thereof, in another implementation of the first aspect, the determining the transmission parameter used for the uplink data transmission according to the target SRS resource subset includes: determining a precoding matrix used for transmitting a SRS in the target SRS resource subset as a precoding matrix used for the uplink data transmission.

In combination with the first aspect and the implementation, in another implementation of the first aspect, the target SRS resource subset is a target SRS resource combination, a quantity of SRS resources in the target SRS resource combination is K, and K is equal to a quantity of data transmission layers corresponding to the uplink data transmission; the determining the precoding matrix used for transmitting the SRS in the target SRS resource subset as the precoding matrix used for the uplink data transmission, includes: determining a precoding matrix used by each SRS resource in the target SRS resource combination to acquire K precoding matrices; and determining the K precoding matrices as precoding matrices of K data transmission layers, wherein the K precoding matrices correspond to the K data transmission layers one by one.

Therefore, uplink transmission corresponding to different SRS resources may adopt the same precoding matrix as that on the SRS resources, thus matching with channel information of panels transmitting corresponding data.

In combination with the first aspect and the implementation thereof, in another implementation of the first aspect, the determining the transmission parameter used for the uplink data transmission according to the target SRS resource subset includes: determining a total quantity of antenna ports of the target SRS resource subset and/or a quantity of SRS resources contained in the target SRS resource subset as a quantity of antenna ports used for the uplink data transmission.

For example, if the target SRS resource subset is a target SRS resource, the terminal device may use a quantity of antenna ports of the target SRS resource as a quantity of antenna ports used for uplink data transmission.

For another example, if the target SRS resource subset is a target SRS combination, and the target SRS combination includes a plurality of SRS resources, wherein each SRS resource is a single-port SRS resource, the terminal device may determine a quantity of the plurality of SRS resources as a quantity of antenna ports used for uplink data transmission.

Therefore, the quantity of antenna ports for the uplink data transmission is acquired through the method, so that data transmission on different panels may adopt independent quantities of antenna ports.

In combination with the first aspect and the implementation thereof, in another implementation of the first aspect, the determining the transmission parameter used for the uplink data transmission according to the target SRS resource subset includes: determining a beam transmitting an SRS in the target SRS resource subset as a beam used for the uplink data transmission.

In combination with the first aspect and the implementation, in another implementation of the first aspect, the target SRS resource subset is a target SRS resource combination, a quantity of SRS resources in the target SRS resource combination is K, and K is equal to a quantity of data transmission layers corresponding to the uplink data transmission; the determining the beam for receiving or sending the SRS in the target SRS resource subset as the beam used for the uplink data transmission, includes: determining K transmission beams used for sending a SRS in the target SRS resource combination; taking the K transmission beams as transmission beams of K data transmission layers, wherein the K transmission beams correspond to the K data transmission layers one by one.

Therefore, different beams may be used for uplink transmission corresponding to different reference signal resources, thus matching channel information of panels transmitting corresponding data.

In combination with the first aspect and the implementation thereof, in another implementation of the first aspect, the determining the transmission parameter used for the uplink data transmission according to the target SRS resource subset includes: determining a power control parameter corresponding to the target SRS resource subset as a power control parameter used for the uplink data transmission according to a corresponding relationship between a SRS resource subset and a power control parameter.

In combination with the first aspect and the implementation thereof, in another implementation of the first aspect, the method further includes: determining a power control parameter corresponding to the target SRI as a power control parameter used for the uplink data transmission according to a corresponding relationship between a SRI and a power control parameter.

In combination with the first aspect and the implementation thereof, in another implementation of the first aspect, the power control parameter includes at least one of: an open-loop power control parameter, a closed-loop power control parameter, and a path loss estimation value.

Therefore, uplink transmission corresponding to different reference signal resources may adopt different transmission powers, thus matching channel gains of beams or panels transmitting corresponding data.

In combination with the first aspect and the implementation thereof, in another implementation of the first aspect, the determining the transmission parameter used for the uplink data transmission according to the target SRS resource subset includes: determining a panel that transmits an SRS in the target SRS resource subset as a panel used for the uplink data transmission.

For example, the target SRS resource subset is an SRS resource combination, and the terminal device determines a panel used when sending a SRS on the SRS resource combination as a panel for transmitting the uplink data.

Therefore, different panels may be used for uplink transmission corresponding to different reference signal resources, so that data may be transmitted on a better panel according to reference signals, or a plurality of panels of a terminal may be fully utilized to transmit data at the same time.

Therefore, in the method for uplink data transmission according to the implementation of the present disclosure, a terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed.

In a second aspect, there is provided a method for uplink data transmission, the method includes: sending subset constraint indication information of a sounding reference signal (SRS) resource to a terminal device, wherein the subset constraint indication information is used for indicating at least one available SRS resource subset; determining a length of a SRS resource indicator (SRI) contained in downlink control information (DCI) for scheduling the uplink data transmission according to the subset constraint indication information; determining a target SRS resource subset in the at least one available SRS resource subset, wherein the target SRS resource subset is used for the terminal device to determine a transmission parameter for the uplink data transmission; and sending the DCI including a target SRI to the terminal device according to the length of the SRI, wherein the target SRI is used for indicating the target SRS resource subset.

Therefore, in the method for uplink data transmission according to the implementation of the present disclosure, a network device sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to currently available SRS resource subsets, and removing some SRI indication contents which will not be adopted.

In combination with the second aspect, in one implementation of the second aspect, each SRS resource subset in the at least one available SRS resource subset is one SRS resource.

In combination with the second aspect and the implementation thereof, in another implementation of the second aspect, the method further includes: sending resource set indication information to the terminal device, wherein the resource set indication information is used for indicating at least one SRS resource set, and the subset constraint indication information is used for indicating at least one available SRS resource in the at least one SRS resource set.

In combination with the second aspect and the implementation thereof, in another implementation of the second aspect, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

In combination with the second aspect and the implementation thereof, in another implementation of the second aspect, each SRS resource subset in the at least one available SRS resource subset is one SRS resource combination, and the one SRS resource combination includes at least one SRS resource.

In combination with the second aspect and the implementation thereof, in another implementation of the second aspect, the method further includes: determining at least one pre-configured SRS resource combination, wherein the subset constraint indication information is used for indicating at least one available SRS resource combination in the at least one SRS resource combination.

In combination with the second aspect and the implementation thereof, in another implementation of the second aspect, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

In combination with the second aspect and the implementation thereof, in another implementation of the second aspect, the at least one SRS resource combination includes all combinations among SRS resources in one SRS resource set.

In combination with the second aspect and the implementation thereof, in another implementation of the second aspect, the determining the length of the SRI contained in the downlink control information (DCI) for scheduling the uplink data transmission according to the subset constraint indication information includes: determining the length of the SRI according to a quantity of the at least one available SRS resource subset.

In combination with the second aspect and the implementation thereof, in another implementation of the second aspect, the determining the length of the SRI according to the quantity of the at least one available SRS resource subset includes: determining that the length of the SRI is equal to $\lceil \log_2 K \rceil$, wherein $\lceil \ \rceil$ represents upward rounding and K is equal to the quantity of the at least one available SRS resource subset.

In combination with the second aspect and the implementation thereof, in another implementation of the second aspect, the method further includes: determining a corresponding relationship between a value of the SRI and the at least one available SRS resource subset according to the subset constraint indication information; and determining the target SRI corresponding to the target SRS resource subset according to the corresponding relationship between the value of the SRI and the at least one available SRS resource subset.

In combination with the second aspect and the implementation thereof, in another implementation of the second aspect, the transmission parameter used for the uplink data transmission includes at least one of: a precoding matrix, a quantity of transmission layers, a quantity of antenna ports, a transmission beam, a power control parameter, and a panel.

Therefore, in the method for uplink data transmission according to the implementation of the present disclosure, a network device sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to currently available SRS resource subsets, and removing some SRI indication contents which will not be adopted.

In a third aspect, a terminal device is provided, which is used for performing the method in the first aspect or any possible implementation of the first aspect. Specifically, the terminal device includes units for performing the method in the first aspect or any possible implementation of the first aspect.

In a fourth aspect, a network device is provided, which is used for performing the method in the second aspect or any possible implementation of the second aspect. Specifically, the network device includes units for performing the method in the second aspect or any possible implementation of the second aspect.

In a fifth aspect, a terminal device is provided, including a memory and a processor, the memory is used for storing instructions, the processor is used for executing the instructions stored in the memory, and when the processor executes the instructions stored in the memory, the execution causes the processor to execute the method of the first aspect or the method in any possible implementation of the first aspect.

In a sixth aspect, a network device is provided, including a memory and a processor, the memory is used for storing instructions, the processor is used for executing the instructions stored in the memory, and when the processor executes the instructions stored in the memory, the execution causes the processor to execute the method of the second aspect or the method in any possible implementation of the second aspect.

In a seventh aspect, a computer readable medium is provided for storing a computer program, the computer program includes instructions for executing the method of the first aspect or the method in any possible implementation of the first aspect.

In an eighth aspect, a computer readable medium is provided for storing a computer program, and the computer program includes instructions for performing the method in the second aspect or the method in any possible implementation of the second aspect.

In a ninth aspect, a computer program product including instructions is provided, when a computer runs the instructions of the computer program product, the computer performs the method for uplink data transmission of the first aspect or the method in any possible implementation of the first aspect. Specifically, the computer program product may be run on the terminal device of the third aspect.

In a tenth aspect, a computer program product including instructions is provided, when a computer runs the instructions of the computer program product, the computer performs the method for uplink data transmission of the second aspect or the method in any possible implementation of the second aspect. Specifically, the computer program product may be run on the network device of the fourth aspect.

DETAILED DESCRIPTION

Hereinafter, technical solutions in the implementations of the present disclosure will be described with reference to the accompanying drawings.

The technical solutions of implementations of the present disclosure may be applied to various communication systems, such as, the Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS) or Worldwide Interoperability for Microwave Access (WiMAX) communication system, future Fifth-Generation (5G) system, or New Radio (NR), etc.

The terminal device in implementations of the present disclosure may be referred to a user device (UE), access terminal, subscriber unit, subscriber station, mobile station, mobile platform, remote station, remote terminal, mobile device, user terminal, terminal, wireless communication device, user agent or user apparatus. The terminal device may also be a cellular phone, a cordless phone, a Session Initiation Protocol (SIP) phone, a Wireless Local Loop (WLL) station, a Personal Digital Assistant (PDA), a pedestrian device with a wireless communication function, a computing device or other processing device connected to a wireless modem, an on-board device, a wearable device, a terminal device in a future 5G network, or a terminal device in a future evolving Public Land Mobile Network (PLMN), etc., which is not restricted in implementations of present disclosure.

The network device in implementations of the present disclosure may be a device for communicating with the terminal device, the network device may be a Base Transceiver Station (BTS) in a GSMC system or CDMA system, a NodeB (NB) in a WCDMA system, may further be an evolutional NodeB in an LTE system (eNB or eNodeB), may further be a wireless controller in a scenario of a Cloud Radio Access Network (CRAN), or the network device may be a relay station, an access point, an on-board device, or a wearable device, a network device in the future 5G network or a network device in the future evolved Public Land Mobile Network (PLMN), etc., which is not restricted in implementations of the present disclosure.

Figure 1:
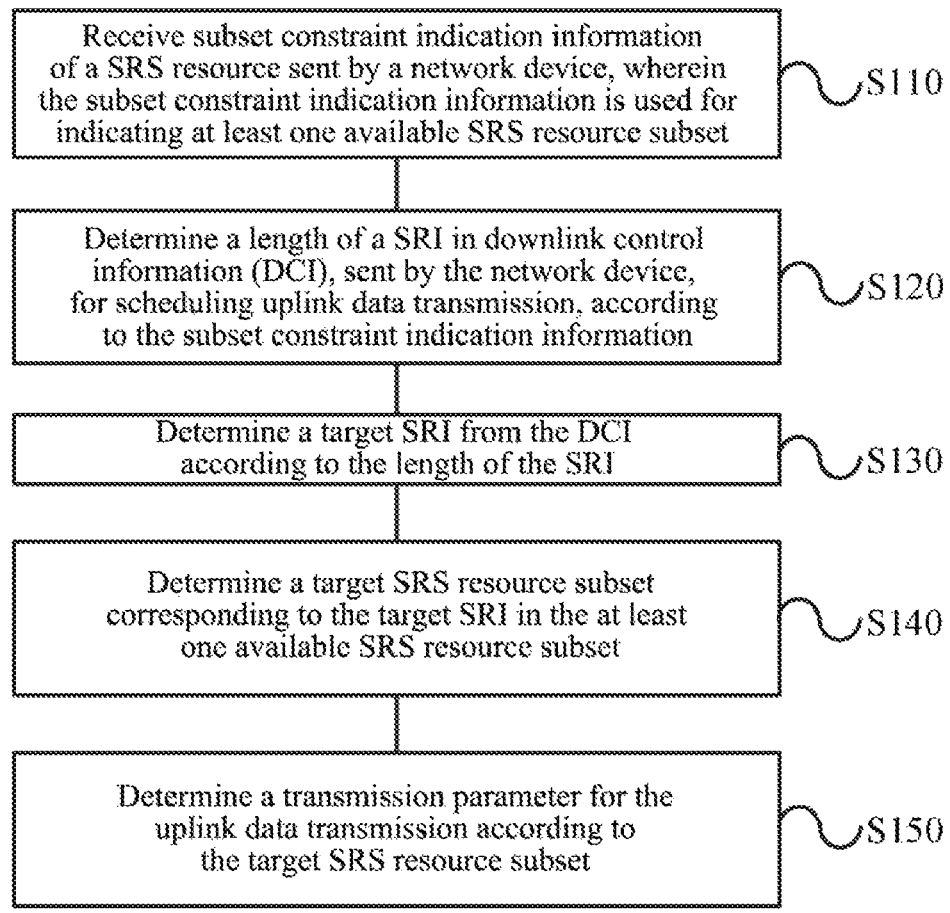
FIG. 1 is a schematic flowchart of a method for uplink data transmission according to an implementation of the present disclosure.

FIG. 1 shows a schematic flowchart of a method 100 for uplink data transmission according to an implementation of the present disclosure, and the method 100 may be performed by a terminal device. As shown in FIG. 1, the method 100 includes acts S110-S150. In S110, subset constraint indication information of a SRS resource sent by a network device is received, wherein the subset constraint indication information is used for indicating at least one available SRS resource subset. In S120, a length of a SRI in downlink control information (DCI), sent by the network device, for scheduling uplink data transmission is determined according to the subset constraint indication information. In S130, a target SRI is determined from the DCI according to the length of the SRI. In S140, a target SRS resource subset corresponding to the target SRI is determined in the at least one available SRS resource subset. In S150, a transmission parameter for the uplink data transmission is determined according to the target SRS resource subset.

In the implementation of the present disclosure, a terminal device receives subset constraint indication information sent by a network device, and the subset constraint indication information is used for indicating at least one available SRS resource subset, each SRS resource subset in the at least one available SRS resource subset may be one SRS resource or one SRS resource combination, and each SRS resource combination may include a plurality of SRS resources.

Optionally, as one implementation, each SRS resource subset in the at least one available SRS resource subset may be one SRS resource, that is, the at least one available SRS resource subset is at least one available SRS resource. Correspondingly, a terminal device may determine at least one SRS resource set, and determine at least one available SRS resource in the at least one SRS resource set according to subset constraint indication information, and the at least one available SRS resource may be used for current PUSCH transmission of the terminal device.

Specifically, a network device may configure at least one SRS resource set for a terminal device, and the at least one SRS resource set includes N SRS resources. For example, the terminal device receives resource set indication information sent by the network device, and the resource set indication information indicates the at least one SRS resource set. The terminal device indicates that M SRS resources among the N SRS resources are at least one available SRS resource according to subset constraint indication information.

Optionally, the subset constraint indication information may be a resource indication bitmap, and the resource indication bitmap has a one-to-one correspondence with N SRS resources included in the at least one SRS resource set, that is, the resource indication bitmap may include N bits, and each bit corresponds to one SRS resource in the N SRS resources. For example, if a bit value is "1", then a corresponding SRS resource is enabled. At least one available SRS resource may be acquired according to the resource indication bitmap, and the at least one available SRS resource may be used for transmitting a PUSCH.

Optionally, among the N SRS resources, in addition to the M available SRS resources, remaining N-M SRS resources may be used for transmitting a SRS, but are not used for acquiring uplink channel state information (CSI) of a PUSCH, and may be used for other purposes, for example, may be used by a network device for acquiring downlink channel information based on channel reciprocity, but the implementation of the present disclosure is not limited thereto.

It should be understood that the SRS resource set in the implementation of the present disclosure may include at least one SRS resource, and each SRS set is used for the same function, but different SRS resource sets may have different functions. Different SRS resources in the same SRS resource set have at least one same parameter, for example, the same parameter may be at least one of the following parameter: a power control parameter, a transmission bandwidth parameter, a quantity of antenna ports, a quantity of orthogonal frequency division multiplexing (OFDM) symbols occupied in one time slot, a quantity of signal repetitions in one time slot, a functional configuration, and a transmission time slot, but the implementation of the present disclosure is not limited thereto. A network device may configure the same parameter for each SRS resource set without configuring these parameters for each reference signal resource in the set respectively, thus saving signaling overhead.

Optionally, as one implementation, each SRS resource subset in the at least one available SRS resource subset may be one SRS resource combination, that is, the at least one available SRS resource subset is at least one available SRS resource combination. Correspondingly, a terminal device may determine at least one pre-configured SRS resource combination, and each SRS resource combination may include a plurality of SRS resources. For example, the terminal device and a network device pre-agree on the at least one SRS resource combination, or the terminal device may receive resource combination indication information sent by the network device, and the resource combination indication information is used for indicating the at least one SRS resource combination. The terminal device determines at least one available SRS resource combination in the at least one SRS resource combination according to the subset constraint indication information, and the at least one available SRS resource combination may be used for current PUSCH transmission of the terminal device.

It should be understood that SRS resources in the at least one SRS resource combination may come from one SRS resource set, or may come from a plurality of SRS resource sets, and configuration parameters of different SRS resource sets may be different.

For example, the at least one SRS resource combination may include all possible combinations among SRS resources in one SRS resource set.

For another example, the at least one SRS resource combination may come from a plurality of SRS resource sets, wherein SRS resources in each SRS resource combination belong to one SRS resource set.

It should be understood that a terminal device determines at least one available SRS resource combination in the pre-configured at least one SRS resource combination according to the subset constraint indication information, wherein the at least one available SRS resource combination may include one or more SRS resource sets.

For example, the SRS resources included in the at least one available SRS resource combination may be at least one SRS resource of top n SRS resources among a plurality of predefined SRS resources, or at least one SRS resource of last N SRS resources.

For another example, the SRS resources included in the at least one available SRS resource combination may be SRS resources in one SRS resource set, or the SRS resources included in the at least one available SRS resource combination may be SRS resources in a plurality of SRS resource sets.

It should be understood that the subset constraint indication information may include a resource combination indication bitmap having a one-to-one correspondence with the at least one SRS resource combination, and the resource combination indication bitmap is used for indicating at least one available SRS resource combination in the at least one SRS resource combination. For example, a length of the resource combination indication bitmap may be equal to a quantity of the at least one SRS resource combination.

For example, a network device configures N single-port SRS resources for a terminal device in advance, the N SRS resources may include a plurality of SRS resource combinations, and subset constraint indication information may be used for indicating at least one available SRS resource combination in the SRS resource combinations included in the N SRS resources. For example, assuming N=2, there may be three combinations of SRS resources, including [0 1], [1 0], and [1 1], where 1 indicates that a corresponding SRS resource is in the combination and 0 indicates that it is not in the combination. At this time, through the subset constraint indication information, the network device may indicate available SRS resource combinations in these possible combinations. For example, the network device may indicate through a manner of a bitmap, wherein each bit corresponds to one possible resource combination, for example, bitmap=[1 1 0] indicates that only first two combinations ([0 1], [1 0]) are available.

Therefore, the network device may restrict the terminal device to use a single panel for current uplink transmission (i.e. a SRS resource combination contains only a SRS resource of a single panel) through the subset constraint indication information, so as to perform panel selection; or limit the terminal device to use a plurality of panels simultaneously for the current uplink transmission (i.e. SRS resources of a plurality of panels are required to be contained in the SRS resource combination), so as to carry out simultaneous panel transmission.

In S120, the terminal device may determine the length of the SRI in the downlink control information DCI, sent by the network device, for scheduling uplink data transmission, according to the subset constraint indication information. Specifically, the terminal device may determine the length of the SRI in the DCI according to a quantity of at least one SRS resource subset indicated in the subset constraint indication information.

Specifically, the terminal device may determine a quantity of bits of the SRI as $\lceil \log_2 K \rceil$, where K is a quantity of the at least one available SRS resource subset, and $\lceil \ \rceil$ represents upward rounding.

Optionally, the terminal device may set the quantity of bits of the SRI equal to the quantity of at least one available SRS resource subset, that is, the SRI is a bitmap, the bitmap has a one-to-one correspondence with the SRS resource subset in the at least one available SRS resource subset, and whether a corresponding available SRS resource subset is a target SRS resource subset indicated by the SRI is determined by each value of the bitmap.

In this way, since the subset constraint indication information may reduce contents indicated by the SRI, the quantity of bits of the SRI may be reduced.

In the implementation of the present disclosure, the terminal device may determine different SRS resource subsets indicated by different SRIs according to the subset constraint indication information. Specifically, according to at least one available SRS resource subset indicated by the subset constraint indication information, the terminal device may determine a corresponding relationship between different SRIs and different SRS resource subsets in the at least one available SRS resource subset, and each available SRS resource subset corresponds to a SRI.

For example, if N SRS resources are predetermined between the terminal device and the network device, assuming N=2, there may be three combinations of SRS resources, including [0 1], [1 0], and [1 1], where 1 indicates that a corresponding SRS resource is in the combination and 0 indicates that it is not in the combination. At this time, through the subset constraint indication information, the network device may indicate available SRS resource combinations in these possible combinations. For example, the network device may indicate through a bitmap, wherein each bit corresponds to one possible resource combination, for example, bitmap=[1 1 0] indicates that only first two combinations ([0 1], [1 0]) are available SRS resource combinations. Since the quantity of available SRS resource combinations is 2, according to the formula ⌈ $\log_2$ ⌉, only 1 bit of a SRI is required to indicate the two available SRS resource combinations, for example, "1" indicates [1 0] of the available SRS resource combinations; "0" indicates [1 0] in the available SRS resource combinations.

In S130, the terminal device determines the target SRI from the received DCI transmitted by the network device according to the determined length of the SRI. In S140, the terminal device determines a SRS resource subset corresponding to the target SRI as the target SRS resource subset in the at least one available SRS resource subset according to a corresponding relationship between a SRI and an available SRS resource subset.

In this way, the terminal device and the network device indicate the target SRS resource subset in the available SRS resource subset through the SRI, which may reduce some indication contents of the SRI that will not be adopted, thus reducing SRI overhead in the DCI.

In S150, the terminal device determines the transmission parameter used for uplink data transmission scheduled by the DCI according to the target SRS resource subset, wherein the transmission parameter used for uplink data transmission includes at least one of: a precoding matrix, a quantity of transmission layers, a quantity of antenna ports, a transmission beam, a power control parameter and a panel.

Optionally, as one implementation, the terminal device may determine a precoding matrix used for first uplink data transmission according to a corresponding relationship among a quantity of antenna ports, PMI information and the precoding matrix. Specifically, the terminal device determines a quantity of antenna ports of the target SRS resource subset and target PMI information, and takes a precoding matrix corresponding to the quantity of antenna ports of the target SRS resource subset and the target PMI information as a precoding matrix used for uplink data transmission according to the corresponding relationship among the quantity of antenna ports, the PMI information and the precoding matrix.

Optionally, the DCI received by the terminal device and sent by the network device may include the target PMI information.

Optionally, the corresponding relationship between the quantity of antenna ports, the PMI information and the precoding matrix may be predetermined.

Optionally, the quantity of antenna ports of the target SRS resource subset is equal to a quantity of antenna ports included in a panel transmitting the SRS.

Therefore, the precoding matrix used for uplink data transmission scheduled by the DCI is acquired based on the method, so that data transmission on different panels may adopt independent precoding matrices, thereby increasing flexibility of uplink scheduling.

Optionally, as one implementation, the terminal device may determine a total quantity of antenna ports of the target SRS resource subset and/or a quantity of SRS resources included in the target SRS resource subset as a quantity of transmission layers of the uplink data transmission. For example, if the target SRS resource subset is a target SRS resource combination, and the target SRS resource combination includes K SRS resources, the quantity of transmission layers of the uplink data transmission is K. For another example, if the target SRS resource subset is a target SRS resource, the terminal device determines a quantity of antenna ports of the target SRS resource as the quantity of transmission layers of the uplink data transmission.

Optionally, as one implementation, the terminal device may determine a precoding matrix used for transmitting a SRS in the target SRS resource subset as the precoding matrix used for the first uplink data transmission.

Specifically, if the target SRS resource subset is a target SRS resource combination, the target SRS resource combination includes K SRS resources, and K is equal to a quantity of data transmission layers corresponding to the uplink data transmission. The terminal device determines K precoding matrices used by the K SRS resources. The K precoding matrices are respectively determined as K precoding matrices of the data transmission layers, and the K precoding matrices correspond to the K data transmission layers one by one, i.e. one precoding matrix corresponds to one data transmission layer.

Therefore, uplink transmission corresponding to different SRS resources may adopt the same precoding matrix as that on the SRS resources, thus matching with channel information of panels transmitting corresponding data.

Optionally, as one implementation, the terminal device determines a total quantity of antenna ports of the target SRS resource subset and/or a quantity of the at least one SRS resource as a quantity of antenna ports used for the uplink data transmission.

For example, if the target SRS resource subset is a target SRS resource, the terminal device may use a quantity of antenna ports of the target SRS resource as a quantity of antenna ports used for the uplink data transmission.

For another example, if the target SRS resource subset is a target SRS combination, and the target SRS combination includes a plurality of SRS resources, wherein each SRS resource is a single-port SRS resource, the terminal device may determine a quantity of the plurality of SRS resources as a quantity of antenna ports used for uplink data transmission.

Optionally, for codebook-based transmission, the terminal device may determine a corresponding codebook based on a quantity of antenna ports used for the uplink data transmission. For non-codebook-based transmission, the terminal device may determine a quantity of transmission layers of corresponding uplink data according to the quantity of antenna ports.

Therefore, the quantity of antenna ports for the uplink data transmission is acquired through the method, so that data transmission on different panels may adopt independent quantities of antenna ports, thereby improving flexibility of uplink multi-panel scheduling.

Optionally, as one implementation, the terminal device may determine a beam for receiving or transmitting a SRS in the target SRS resource subset as a beam used for the first uplink data transmission.

For example, the terminal device determines a beam used when transmitting a SRS on the SRS resource as a transmission beam for the first uplink data transmission.

For another example, the target SRS resource subset is a target SRS combination, the target SRS combination includes K SRS resources, and K is equal to a quantity of data transmission layers corresponding to the uplink data transmission. The terminal device determines K transmission beams used when transmitting SRS resources among the K SRS resources, and takes the K transmission beams as K transmission beams of the data transmission layers, wherein the K transmission beams correspond to the K data transmission layers one by one.

Therefore, different beams may be used for uplink transmission corresponding to different reference signal resources, thus matching channel information of panels transmitting corresponding data.

Optionally, as one implementation, the terminal device may determine a power control parameter corresponding to the target SRS resource subset as a transmission power used for the uplink data transmission according to a corresponding relationship between a SRS resource subset and a power control parameter. The target SRS resource subset is one SRS combination or one SRS resource.

Or, the terminal device may determine a power control parameter corresponding to the target SRI as a transmission power used for the uplink data transmission according to a corresponding relationship between a SRI and a power control parameter.

It should be understood that the corresponding relationship between the SRS resource subset and the power control parameter, and/or the corresponding relationship between the SRI and the power control parameter may be configured in advance by the network device for the terminal device, and the implementation of the present disclosure is not limited thereto.

It should be understood that the power control parameter may include at least one of: an open-loop power control parameter, a closed-loop power control parameter, and a path loss estimation value.

Therefore, uplink transmission corresponding to different reference signal resources may adopt different transmission powers, thus matching channel gains of beams or panels transmitting corresponding data.

Optionally, as one implementation, the terminal device may determine a panel for receiving or transmitting a SRS in the target SRS resource subset as a panel used for the uplink data transmission.

For example, the target SRS resource subset is an SRS resource combination, and the terminal device determines a panel used when sending a SRS on the SRS resource combination as a panel for transmitting the uplink data.

Therefore, different panels may be used for uplink transmission corresponding to different reference signal resources, so that data may be transmitted on a better panel according to reference signals, or multiple panels of a terminal may be fully utilized to transmit data at the same time, thereby improving performance of uplink transmission.

In the implementation of the present disclosure, a target SRS resource subset may be one SRS resource combination or one SRS resource, and the one SRS resource combination or the one SRS resource is an SRS resource of CSI, acquired by a network device, for the uplink data transmission. The uplink CSI may be rank indication (RI), PMI, or channel quality indicator (CQI), etc., and is used for acquiring a modulation and coding scheme (MCS) and frequency domain resource scheduling for the uplink transmission.

Therefore, in the method for uplink data transmission according to the implementation of the present disclosure, a terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed, thereby reducing SRI overhead in the DCI.

The method for uplink data transmission according to the implementation of the present disclosure is described in detail from a perspective of a terminal device in combination with FIG. 1, and the method for uplink data transmission according to the implementation of the present disclosure will be described from a perspective of a network device below in combination with FIG. 2.

Figure 2:
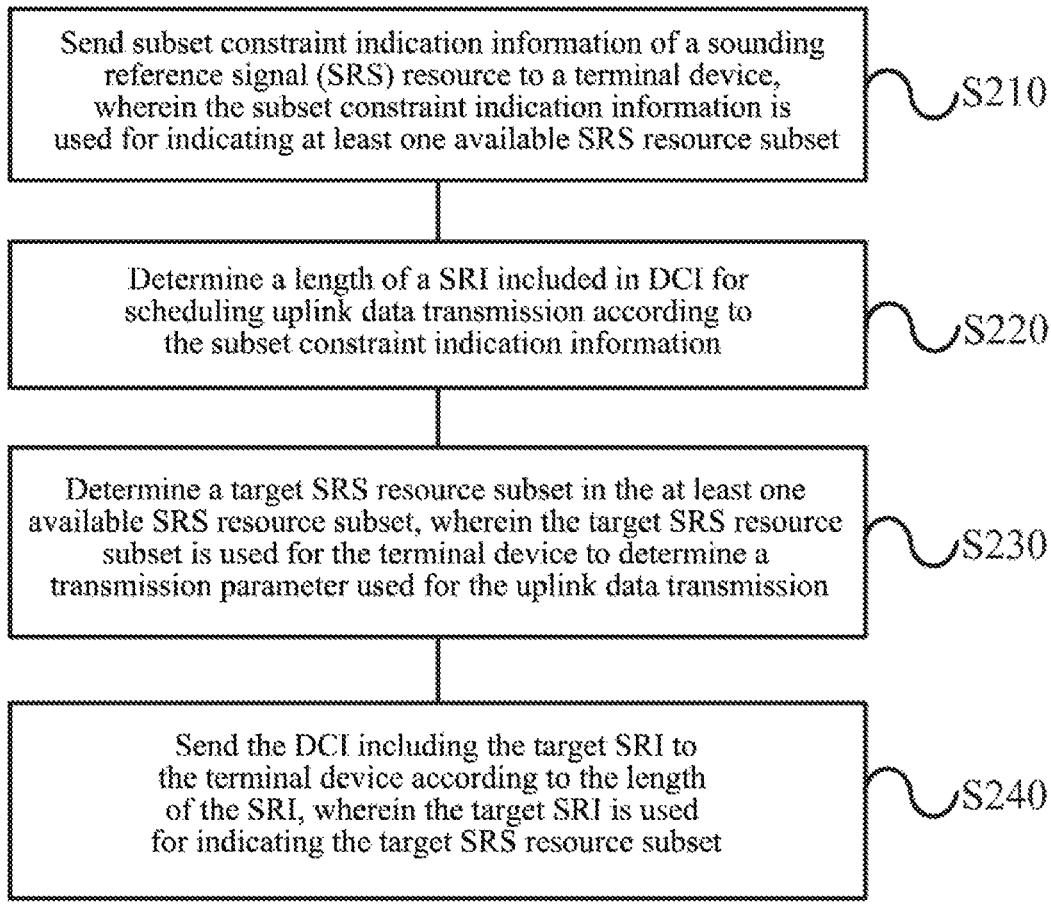
FIG. 2 is another schematic flowchart of a method for uplink data transmission according to an implementation of the present disclosure.

FIG. 2 shows a schematic flowchart of a method 200 for uplink data transmission according to an implementation of the present disclosure, and the method 200 may be executed by a network device. As shown in FIG. 2, the method 200 includes acts S210-S240. In S210, subset constraint indication information of a sounding reference signal (SRS) resource is sent to a terminal device, wherein the subset constraint indication information is used for indicating at least one available SRS resource subset. In S220, a length of an SRI included in DCI for scheduling uplink data transmission is determined according to the subset constraint indication information. In S230, a target SRS resource subset in the at least one available SRS resource subset is determined, wherein the target SRS resource subset is used for the terminal device to determine a transmission parameter used for the uplink data transmission. In S240, the DCI including the target SRI is sent to the terminal device according to the length of the SRI, wherein the target SRI is used for indicating the target SRS resource subset.

Therefore, in the method for uplink data transmission according to the implementation of the present disclosure, a network device sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to currently available SRS resource subsets, removing some SRI indication contents which will not be adopted, and further reducing SRI overhead in the DCI.

Optionally, each SRS resource subset in the at least one available SRS resource subset is one SRS resource.

Optionally, the method further includes: resource set indication information is sent to the terminal device, wherein the resource set indication information is used for indicating at least one SRS resource set, and the subset constraint indication information is used for indicating at least one available SRS resource in the at least one SRS resource set.

Optionally, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

Optionally, each SRS resource subset in the at least one available SRS resource subset is one SRS resource combination, and the one SRS resource combination includes at least one SRS resource.

Optionally, the method further includes: at least one pre-configured SRS resource combination is determined, and the subset constraint indication information is used for indicating at least one available SRS resource combination in the at least one SRS resource combination.

Optionally, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

Optionally, the at least one SRS resource combination includes all combinations among SRS resources in one SRS resource set.

Optionally, the determining the length of the SRI included in the DCI for scheduling the uplink data transmission according to the subset constraint indication information includes: determining the length of the SRI according to a quantity of the at least one available SRS resource subset.

Optionally, the determining the length of the SRI according to the quantity of the at least one available SRS resource subset, includes: determining that the length of the SRI is equal to $\lceil \log_2 \rceil$, wherein $\lceil \rceil$ represents upward rounding and K is equal to the quantity of the at least one available SRS resource subset.

Optionally, the method further includes: determining a corresponding relationship between a value of the SRI and the at least one available SRS resource subset according to the subset constraint indication information; and determining the target SRI corresponding to a target SRS resource subset according to the corresponding relationship between the value of the SRI and the at least one available SRS resource subset.

Optionally, the transmission parameter used for the uplink data transmission includes at least one of: a precoding matrix, a quantity of transmission layers, a quantity of antenna ports, a transmission beam, a power control parameter and a panel.

It should be understood that the network device in the method 200 in the implementation of the present disclosure may correspond to the network device in the method 100, and the terminal device in the method 200 may correspond to the terminal device in the method 100, which will not be repeated here.

Therefore, in the method for uplink data transmission according to the implementation of the present disclosure, a network device sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to currently available SRS resource subsets, removing some SRI indication contents which will not be adopted, and further reducing SRI overhead in the DCI.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

The term "and/or" in this document is merely used to describe an association relationship between associated objects, indicating that there may be three relationships, for example, a and/or b may indicate three situations: A alone, A and B, and B alone. In addition, the symbol "/" in this document generally indicates that objects before and after the symbol "/" have an "or" relationship.

The method for uplink data transmission according to the implementation of the present disclosure is described in detail with reference to FIGS. 1 to 2. A terminal device and a network device according to the implementation of the present disclosure will be described below with reference to FIGS. 3 to 6.

Figure 3:
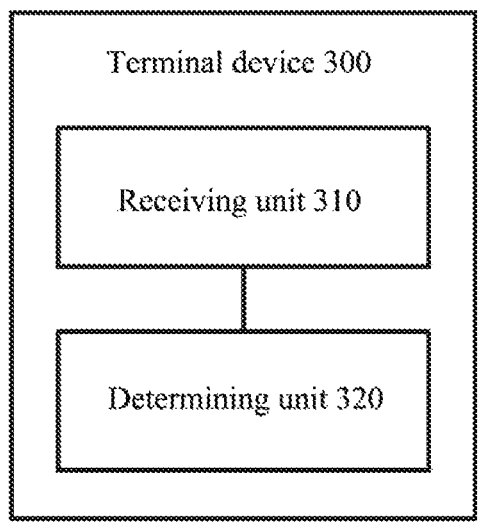
FIG. 3 is a schematic block diagram of a terminal device according to an implementation of the present disclosure.

As shown in FIG. 3, the terminal device 300 according to the implementation of the present disclosure includes a receiving unit 310 and a determining unit 320. Specifically, the receiving unit 310 is used for receiving subset constraint indication information of sounding reference signal (SRS) resources sent by a network device, and the subset constraint indication information is used for indicating at least one available SRS resource subset. The determining unit 320 is used for determining a length of a SRI in downlink control information (DCI), sent by the network device, for scheduling uplink data transmission, according to the subset constraint indication information. The determining unit 320 is further used for determining a target SRI from the DCI according to the length of the SRI. The determining unit 320 is further used for determining a target SRS resource subset corresponding to the target SRI in the at least one available SRS resource subset. The determining unit 320 is further used for determining a transmission parameter used for the uplink data transmission according to the target SRS resource subset.

Therefore, for the terminal device of the implementation of the present disclosure, the terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed, thereby reducing SRI overhead in the DCI.

Optionally, each SRS resource subset in the at least one available SRS resource subset is one SRS resource.

Optionally, the receiving unit 310 is further used for receiving resource set indication information sent by the network device, wherein the resource set indication information is used for indicating at least one SRS resource set, and the subset constraint indication information is used for indicating at least one available SRS resource in the at least one SRS resource set.

Optionally, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

Optionally, each SRS resource subset in the at least one available SRS resource subset is one SRS resource combination, and the one SRS resource combination includes at least one SRS resource.

Optionally, the determining unit 320 is further used for determining at least one pre-configured SRS resource combination, and the subset constraint indication information is used for indicating at least one available SRS resource combination in the at least one SRS resource combination.

Optionally, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

Optionally, the at least one SRS resource combination includes all combinations among SRS resources in one SRS resource set.

Optionally, the determining unit 320 is specifically used for determining the length of the SRI according to a quantity of the at least one available SRS resource subset.

Optionally, the determining unit 320 is specifically used for determining that the length of the SRI is equal to $\lceil \log_2 \rceil$, wherein $\lceil \ \rceil$ represents upward rounding and K is equal to the quantity of the at least one available SRS resource subset.

Optionally, the determining unit 320 is specifically used for determining a corresponding relationship between a value of the SRI and the at least one available SRS resource subset according to the subset constraint indication information; determining a target SRS resource subset corresponding to the target SRI from the at least one available SRS resource subset according to the corresponding relationship between the value of the SRI and the at least one available SRS resource subset.

Optionally, the transmission parameter used for the uplink data transmission includes at least one of: a precoding matrix, a quantity of transmission layers, a quantity of antenna ports, a transmission beam, a power control parameter and a panel.

Optionally, the determining unit 320 is specifically used for determining a quantity of antenna ports of the target SRS resource subset and target precoding matrix indicator (PMI) information; determining a precoding matrix corresponding to the quantity of antenna ports of the target SRS resource subset and the target PMI information as a precoding matrix used for uplink data transmission according to the corresponding relationship among the quantity of antenna ports, the PMI information and the precoding matrix.

Optionally, the DCI includes the target PMI information.

Optionally, the determining unit 320 is specifically used for determining a total quantity of antenna ports of the target SRS resource subset and/or a quantity of SRS resources included in the target SRS resource subset as a quantity of transmission layers of the uplink data transmission.

Optionally, the determining unit 320 is specifically used for determining a precoding matrix used for transmitting an SRS in the target SRS resource subset as the precoding matrix used for the uplink data transmission.

Optionally, the target SRS resource subset is a target SRS resource combination, a quantity of SRS resources in the target SRS resource combination is K, and K is equal to a quantity of data transmission layers corresponding to the uplink data transmission. The determining unit 320 is specifically used for determining a precoding matrix used by each SRS resource in the target SRS resource combination to acquire K precoding matrices; and determining the K precoding matrices as precoding matrices of K data transmission layers, wherein the K precoding matrices correspond to the K data transmission layers one by one.

Optionally, the determining unit 320 is specifically used for determining a total quantity of antenna ports of the target SRS resource subset and/or a quantity of SRS resources contained in the target SRS resource subset as a quantity of antenna ports used for the uplink data transmission.

Optionally, the determining unit 320 is specifically used for determining a beam transmitting a SRS in the target SRS resource subset as a beam used for the uplink data transmission.

Optionally, the determining unit 320 is specifically used for determining a power control parameter corresponding to the target SRS resource subset as a power control parameter used for the uplink data transmission according to a corresponding relationship between an SRS resource subset and a power control parameter.

Optionally, the determining unit 320 is specifically used for determining a power control parameter corresponding to the target SRI as a power control parameter used for the uplink data transmission according to a corresponding relationship between a SRI and a power control parameter.

Optionally, the power control parameter includes at least one of: an open-loop power control parameter, a closed-loop power control parameter, and a path loss estimation value.

Optionally, the determining unit 320 is specifically used for determining a panel that transmits a SRS in the target SRS resource subset as a panel used for the uplink data transmission.

It should be understood that the terminal device 300 according to the implementation of the present disclosure may correspondingly perform the method 100 in the implementation of the present disclosure, and the above and other operations and/or functions of various units in the terminal device 300 are respectively for realizing corresponding flows of the terminal device of various methods in FIGS. 1 to 2, and will not be repeated here for the sake of brevity.

Therefore, for the terminal device of the implementation of the present disclosure, the terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed, thereby reducing SRI overhead in the DCI.

Figure 4:
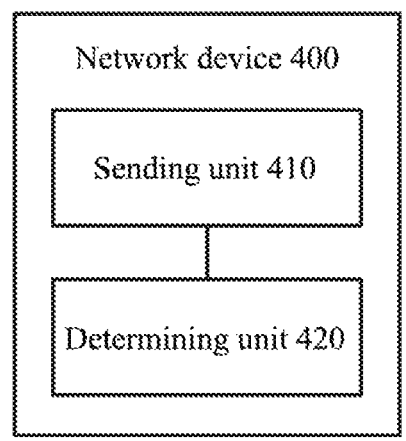
FIG. 4 is a schematic block diagram of a network device according to an implementation of the present disclosure.

As shown in FIG. 4, a network device 400 according to the implementation of the present disclosure includes a sending unit 410 and a determining unit 420. Specifically, the sending unit 410 is used for sending subset constraint indication information of a sounding reference signal (SRS) resource to a terminal device, and the subset constraint indication information is used for indicating at least one available SRS resource subset. The determining unit 420 is used for determining a length of an SRS resource indicator (SRI) included in downlink control information (DCI) for scheduling uplink data transmission, according to the subset constraint indication information. The determining unit 420 is further used for determining a target SRS resource subset in the at least one available SRS resource subset, and the target SRS resource subset is used for the terminal device to determine a transmission parameter used for the uplink data transmission. The sending unit 410 is further used for sending the DCI including a target SRI to the terminal device according to the length of the SRI, and the target SRI is used for indicating the target SRS resource subset.

Therefore, the network device of the implementation of the present disclosure sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to a currently available SRS resource subset, removing some SRI indication contents which will not be adopted, and further reducing SRI overhead in the DCI.

Optionally, each SRS resource subset in the at least one available SRS resource subset is one SRS resource.

Optionally, the sending unit 410 is further used for sending resource set indication information to the terminal device, wherein the resource set indication information is used for indicating at least one SRS resource set, and the subset constraint indication information is used for indicating at least one available SRS resource in the at least one SRS resource set.

Optionally, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

Optionally, each SRS resource subset in the at least one available SRS resource subset is one SRS resource combination, and the one SRS resource combination includes at least one SRS resource.

Optionally, the determining unit 420 is specifically used for determining at least one pre-configured SRS resource combination, and the subset constraint indication information is used for indicating at least one available SRS resource combination in the at least one SRS resource combination.

Optionally, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

Optionally, the at least one SRS resource combination includes all combinations among SRS resources in one SRS resource set.

Optionally, the determining unit 420 is specifically used for determining the length of the SRI according to a quantity of the at least one available SRS resource subset.

Optionally, the determining unit 420 is specifically used for determining that the length of the SRI is equal to $\lceil \log_2 \rceil$, wherein $\lceil \, \rceil$ represents upward rounding and K is equal to the quantity of the at least one available SRS resource subset.

Optionally, the determining unit is specifically used for determining a corresponding relationship between a value of the SRI and the at least one available SRS resource subset according to the subset constraint indication information; and determining the target SRI corresponding to a target SRS resource subset according to the corresponding relationship between the value of the SRI and the at least one available SRS resource subset.

Optionally, the transmission parameter used for the uplink data transmission includes at least one of: a precoding matrix, a quantity of transmission layers, a quantity of antenna ports, a transmission beam, a power control parameter and a panel.

It should be understood that the network device 400 according to the implementation of the present disclosure may correspondingly perform the method 200 in the implementation of the present disclosure, and the above and other operations and/or functions of various units in the network device 400 are respectively for realizing corresponding flows of the network device of various methods in FIGS. 1 to 2, and will not be repeated here for the sake of brevity.

Therefore, the network device of the implementation of the present disclosure sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to a currently available SRS resource subset, removing some SRI indication contents which will not be adopted, and further reducing SRI overhead in the DCI.

Figure 5:
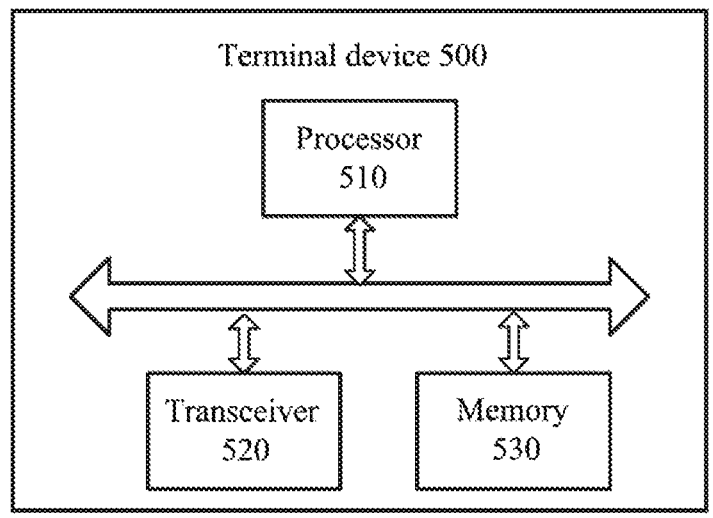
FIG. 5 is another schematic block diagram of a terminal device according to an implementation of the present disclosure.

FIG. 5 shows a schematic block diagram of a network device 500 according to the implementation of the present disclosure. As shown in FIG. 5, the network device 500 includes a processor 510 and a transceiver 520, the processor 510 and the transceiver 520 are connected, and optionally, the terminal device 500 further includes a memory 530 connected to the processor 510. The processor 510, the memory 530, and the transceiver 520 communicate with each other through an internal connection path to transfer and/or control data signals. The memory 530 may be used for storing instructions. The processor 510 is used for executing the instructions stored in the memory 530 to control the transceiver 520 to send information or signals. The transceiver 520 is used for receiving subset constraint indication information of a sounding reference signal (SRS) resource sent by a network device, and the subset constraint indication information is used for indicating at least one available SRS resource subset. The processor 510 is used for determining a length of a SRI in downlink control information (DCI), sent by the network device, for scheduling uplink data transmission, according to the subset constraint indication information, determining a target SRI from the DCI according to the length of the SRI; determining a target SRS resource subset corresponding to the target SRI in the at least one available SRS resource subset; and determining a transmission parameter used for the uplink data transmission according to the target SRS resource subset.

Therefore, for the terminal device of the implementation of the present disclosure, the terminal device receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed, thereby reducing SRI overhead in the DCI.

Optionally, as one implementation, each SRS resource subset in the at least one available SRS resource subset is one SRS resource.

Optionally, as one implementation, the transceiver 520 is used for receiving resource set indication information sent by the network device, wherein the resource set indication information is used for indicating at least one SRS resource set, and the subset constraint indication information is used for indicating at least one available SRS resource in the at least one SRS resource set.

Optionally, as one implementation, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

Optionally, as one implementation, each SRS resource subset in the at least one available SRS resource subset is one SRS resource combination, and the one SRS resource combination includes at least one SRS resource.

Optionally, as one implementation, the processor 510 is used for determining at least one pre-configured SRS resource combination, and the subset constraint indication information is used for indicating at least one available SRS resource combination in the at least one SRS resource combination.

Optionally, as one implementation, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

Optionally, as one implementation, the at least one SRS resource combination includes all combinations among SRS resources in one SRS resource set.

Optionally, as one implementation, the processor 510 is used for determining the length of the SRI according to a quantity of the at least one available SRS resource subset.

Optionally, as one implementation, the processor 510 is used for determining that the length of the SRI is equal to $\lceil \log_2 K \rceil$, wherein $\lceil \ \rceil$ represents upward rounding and K is equal to the quantity of the at least one available SRS resource subset.

Optionally, as one implementation, the processor 510 is used for: determining a corresponding relationship between a value of the SRI and the at least one available SRS resource subset according to the subset constraint indication information; determining a target SRS resource subset corresponding to the target SRI from the at least one available SRS resource subset according to the corresponding relationship between the value of the SRI and the at least one available SRS resource subset.

Optionally, as one implementation, the transmission parameter used for the uplink data transmission includes at least one of: a precoding matrix, a quantity of transmission layers, a quantity of antenna ports, a transmission beam, a power control parameter and a panel.

Optionally, as one implementation, the processor 510 is used for determining a quantity of antenna ports of the target SRS resource subset and target precoding matrix indicator (PMI) information; determining a precoding matrix corresponding to the quantity of antenna ports of the target SRS resource subset and the target PMI information as a precoding matrix used for uplink data transmission according to the corresponding relationship among the quantity of antenna ports, the PMI information and the precoding matrix.

Optionally, as one implementation, the DCI includes the target PMI information.

Optionally, as one implementation, the processor 510 is used for determining a total quantity of antenna ports of the target SRS resource subset and/or a quantity of SRS resources included in the target SRS resource subset as a quantity of transmission layers of the uplink data transmission.

Optionally, as one implementation, the processor 510 is used for determining a precoding matrix used for transmitting a SRS in the target SRS resource subset as a precoding matrix used for uplink data transmission.

Optionally, as one implementation, the target SRS resource subset is a target SRS resource combination, a quantity of SRS resources in the target SRS resource combination is K, and K is equal to a quantity of data transmission layers corresponding to the uplink data transmission. The processor 510 is used for determining a precoding matrix used by each SRS resource in the target SRS resource combination to acquire K precoding matrices; and determining the K precoding matrices as precoding matrices of K data transmission layers, wherein the K precoding matrices correspond to the K data transmission layers one by one.

Optionally, as one implementation, the processor 510 is used for determining a total quantity of antenna ports of the target SRS resource subset and/or a quantity of SRS resources contained in the target SRS resource subset as a quantity of antenna ports used for the uplink data transmission.

Optionally, as one implementation, the processor 510 is used for determining a beam transmitting an SRS in the target SRS resource subset as a beam used for the uplink data transmission.

Optionally, as one implementation, the processor 510 is used for determining a power control parameter corresponding to the target SRS resource subset as a power control parameter used for the uplink data transmission according to a corresponding relationship between a SRS resource subset and a power control parameter.

Optionally, as one implementation, the processor 510 is used for determining a power control parameter corresponding to the target SRI as a power control parameter used for the uplink data transmission according to a corresponding relationship between an SRI and a power control parameter.

Optionally, as one implementation, the power control parameter includes at least one of: an open-loop power control parameter, a closed-loop power control parameter, and a path loss estimation value.

Optionally, as one implementation, the processor 510 is used for determining a panel that transmits a SRS in the target SRS resource subset as a panel used for the uplink data transmission.

It should be understood that the terminal device 500 according to the implementation of the present disclosure may correspond to the terminal device 300 in the implementation of the present disclosure and may correspond to a relevant body that performs the method 100 according to the implementation of the present disclosure, and the above and other operations and/or functions of various units in the terminal device 500 are respectively for realizing corresponding flows of the terminal device in the methods shown in FIGS. 1 to 2, and will not be repeated here for the sake of brevity.

Therefore, the terminal device of the implementation of the present disclosure receives subset constraint indication information for indicating an available SRS resource subset sent by a network device, determines a length of a target SRI in DCI for scheduling uplink data transmission according to the subset constraint indication information, further determines a target SRS resource subset corresponding to the target SRI in at least one available SRS resource subset, and determines a transmission parameter of corresponding uplink data transmission according to the target SRS resource subset. Thus SRI indication contents may be limited according to currently available SRS resource subsets, and some SRI indication contents which will not be adopted may be removed, thereby reducing SRI overhead in the DCI.

Figure 6:
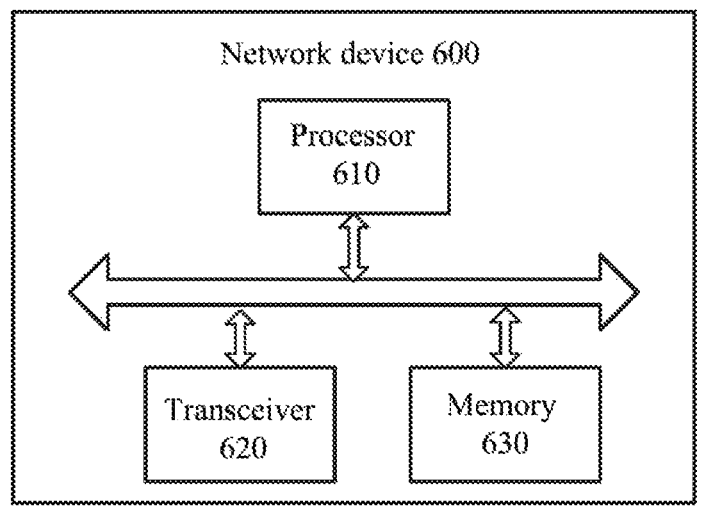
FIG. 6 is another schematic block diagram of a network device according to an implementation of the present disclosure.

FIG. 6 shows a schematic block diagram of a network device 600 according to the implementation of the present disclosure. As shown in FIG. 6, the network device 600 includes a processor 610 and a transceiver 620, the processor 610 and the transceiver 620 are connected, and optionally, the terminal device 600 further includes a memory 630 connected to the processor 610. The processor 610, the memory 630, and the transceiver 620 communicate with each other through an internal connection path to transfer and/or control data signals. The memory 630 may be used for storing instructions. The processor 610 is used for executing the instructions stored in the memory 630 to control the transceiver 620 to send information or signals. The transceiver 620 is used for sending subset constraint indication information of a sounding reference signal (SRS) resource to a terminal device, and the subset constraint indication information is used for indicating at least one available SRS resource subset. The processor 610 is used for determining a length of a SRS resource indicator (SRI) included in downlink control information (DCI) for scheduling uplink data transmission, according to the subset constraint indication information; determining a target SRS resource subset in the at least one available SRS resource subset, wherein the target SRS resource subset is used for the terminal device to determine a transmission parameter used for uplink data transmission; and sending the DCI including a target SRI to the terminal device according to the length of the SRI, wherein the target SRI is used for indicating the target SRS resource subset.

Therefore, the network device of the implementation of the present disclosure sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to a currently available SRS resource subset, removing some SRI indication contents which will not be adopted, and further reducing SRI overhead in the DCI.

Optionally, as one implementation, each SRS resource subset in the at least one available SRS resource subset is one SRS resource.

Optionally, as one implementation, the transceiver 620 is used for sending resource set indication information to the terminal device, and the resource set indication information is used for indicating at least one SRS resource set, and the subset constraint indication information is used for indicating at least one available SRS resource in the at least one SRS resource set.

Optionally, as one implementation, the at least one SRS resource set includes N SRS resources, and the subset constraint indication information includes a resource indication bitmap having a one-to-one correspondence with the N SRS resources, wherein the resource indication bitmap is used for indicating the at least one available SRS resource in the N SRS resources, and N is a positive integer.

Optionally, as one implementation, each SRS resource subset in the at least one available SRS resource subset is one SRS resource combination, and the one SRS resource combination includes at least one SRS resource.

Optionally, as one implementation, the processor 610 is used for determining at least one pre-configured SRS resource combination, and the subset constraint indication information is used for indicating at least one available SRS resource combination in the at least one SRS resource combination.

Optionally, as one implementation, the subset constraint indication information includes a resource combination indication bitmap having a one-to-one correspondence with the at least one SRS resource combination, and the resource combination indication bitmap is used for indicating the at least one available SRS resource combination in the at least one SRS resource combination.

Optionally, as one implementation, the at least one SRS resource combination includes all combinations among SRS resources in one SRS resource set.

Optionally, as one implementation, the processor 610 is used for determining the length of the SRI according to a quantity of the at least one available SRS resource subset.

Optionally, as one implementation, the processor 610 is used for determining that the length of the SRI is equal to $\lceil \log_2 K \rceil$, wherein $\lceil \ \rceil$ represents upward rounding and K is equal to the quantity of the at least one available SRS resource subset.

Optionally, as one implementation, the processor 610 is used for: determining a corresponding relationship between a value of the SRI and the at least one available SRS resource subset according to the subset constraint indication information; and determining the target SRI corresponding to a target SRS resource subset according to the corresponding relationship between the value of the SRI and the at least one available SRS resource subset.

Optionally, as one implementation, the transmission parameter used for the uplink data transmission includes at least one of: a precoding matrix, a quantity of transmission layers, a quantity of antenna ports, a transmission beam, a power control parameter and a panel.

It should be understood that the network device 600 according to the implementation of the present disclosure may correspond to the network device 400 in the implementation of the present disclosure and may correspond to a corresponding entity that performs the method 200 according to the implementation of the present disclosure, and the above and other operations and/or functions of various units in the network device 600 are respectively for realizing corresponding flows of the network device in the methods shown in FIGS. 1 to 2, and will not be repeated here for the sake of brevity.

Therefore, the network device of the implementation of the present disclosure sends subset constraint indication information for indicating an available SRS resource subset to a terminal device, determines a target SRS resource in the available SRS resource subset according to the subset constraint indication information, determines a target SRI in DCI for scheduling uplink data transmission sent to the terminal device, so as to facilitate the terminal device to determine a transmission parameter of corresponding uplink data transmission according to the target SRS resource subset, thus limiting SRI indication contents according to a currently available SRS resource subset, removing some SRI indication contents which will not be adopted, and further reducing SRI overhead in the DCI.

It should be noted that the above method implementations of the present disclosure may be applied to or implemented by a processor. The processor may be an integrated circuit chip with signal processing capability. In the implementation process, the actions of the method implementations described above may be completed by integrated logic circuits of hardware in the processor or instructions in the form of software. The above processor may be a general purpose processor, a digital signal processor (DSP), an application specific integrated circuit (ASIC), a field programmable gate array (FPGA), or another programmable logic device, a discrete gate, or a transistor logic device, or a discrete hardware component. The processor may implement various methods, acts and logic block diagrams disclosed in implementations of the present disclosure. The general purpose processor may be a microprocessor or the processor may be any conventional processor or the like. The acts of the method disclosed in connection with the implementation of the present disclosure may be directly embodied by the execution of the hardware decoding processor, or by the execution of a combination of hardware and software modules in the decoding processor. The software modules may be located in a storage medium commonly used in the art, such as a random access memory, flash memory, read-only memory, programmable read-only memory or electrically erasable programmable memory, or register. The storage medium is located in the memory, and the processor reads the information in the memory and completes the acts of the above method in combination with its hardware.

It should be understood that the memory in implementations of the present disclosure may be a transitory memory or non-transitory memory, or may include both transitory and non-transitory memory. The nonvolatile memory may be Read-Only Memory (ROM), Programmable Rom (PROM), Erasable PROM (EPROM), Electrically Erasable EPROM (EEPROM), or Flash memory. The transitory memory may be a Random Access Memory (RAM) which serves as an external cache. By illustration of example but not restriction, RAM is available in many forms such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It should be noted that the memories of the systems and methods described herein are intended to include, but are not limited to, these and any other suitable types of memories.

Those of ordinary skill in the art will recognize that the example units and algorithm acts described in connection with the implementations disclosed herein may be implemented in electronic hardware, or a combination of computer software and electronic hardware. Whether these functions are implemented in hardware or software depends on a specific application and design constraint of the technical solution. Skilled in the art may use different manners to realize the described functions for each particular application, but such realization should not be considered to be beyond the scope of the present disclosure.

Those skilled in the art may clearly understand that for convenience and conciseness of description, the specific working process of the system, device and unit described above may refer to the corresponding process in the aforementioned implementations of methods, and details are not described herein again.

In several implementations provided by the present disclosure, it should be understood that the disclosed system, device and method may be implemented in other ways. For example, the apparatus implementations described above are only illustrative, for another example, the division of the units is only a logical function division, and there may be other division manners in actual realization. For still another example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the solution of the implementations.

In addition, various functional units in various implementations of the present disclosure may be integrated in one processing unit, or various units may be physically present separately, or two or more units may be integrated in one unit.

The functions may be stored in a computer readable storage medium if implemented in a form of a software functional unit and sold or used as a separate product. Based on this understanding, the technical solution of the present disclosure, in essence, or the part contributing to the existing art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present disclosure. The aforementioned storage media include U disk, mobile hard disk, read-only memory, random access memory, magnetic disk or optical disk, and other media capable of storing program codes.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be the protection scope defined by the claims.

What is claimed is:

1. A method for uplink data transmission, comprising:
receiving subset constraint indication information of a sounding reference signal (SRS) resource sent by a network device, and determining at least one available SRS resource subset according to the subset constraint indication information;
determining a length of an SRS resource indicator (SRI) according to a quantity of the at least one available SRS resource subset indicated by the subset constraint indication information, wherein each SRS resource subset in the at least one available SRS resource subset is one SRS resource combination, and the one SRS resource combination comprises at least one SRS resource;

determining a target SRI from downlink control information (DCI) according to the length of the SRI;

determining a target SRS resource subset corresponding to the target SRI in the at least one available SRS resource subset; and determining a transmission parameter used for uplink data transmission according to the target SRS resource subset, wherein the method further comprises:

determining a corresponding relationship between a value of the SRI and the at least one available SRS resource subset according to the subset constraint indication information; and the determining the target SRS resource subset corresponding to the target SRI in the at least one available SRS resource subset, comprises:

determining the target SRS resource subset corresponding to the target SRI from the at least one available SRS resource subset according to the corresponding relationship between the value of the SRI and the at least one available SRS resource subset.

2. The method according to claim 1, wherein the determining the length of the SRI according to the quantity of the at least one available SRS resource subset comprises:

determining that the length of the SRI is equal to $\lceil \log_2 K \rceil$, wherein $\lceil \ \rceil$ represents upward rounding and K is equal to the quantity of the at least one available SRS resource subset.

3. The method according to claim 1, wherein the transmission parameter used for the uplink data transmission comprises at least one of: a precoding matrix, a quantity of transmission layers, a quantity of antenna ports, a transmission beam, a power control parameter, or a panel.

4. The method according to claim 3, wherein the determining the transmission parameter used for the uplink data transmission according to the target SRS resource subset comprises:

determining a total quantity of antenna ports of the target SRS resource subset or a quantity of SRS resources contained in the target SRS resource subset as a quantity of transmission layers of the uplink data transmission.

5. The method according to claim 3, wherein the determining the transmission parameter used for the uplink data transmission according to the target SRS resource subset comprises:

determining a precoding matrix used for transmitting an SRS in the target SRS resource subset as a precoding matrix used for the uplink data transmission.

6. The method according to claim 3, wherein the determining the transmission parameter used for the uplink data transmission according to the target SRS resource subset comprises:

determining a beam transmitting an SRS in the target SRS resource subset as a beam used for the uplink data transmission.

7. The method according to claim 1, wherein the transmission parameter used for the uplink data transmission comprises a panel; and the determining the transmission parameter used for the uplink data transmission according to the target SRS resource subset comprises:

determining a panel that transmits an SRS in the target SRS resource subset as the panel used for the uplink data transmission.

8. A terminal device, comprising a transceiver and a processor, wherein the transceiver is configured to receive subset constraint indication information of a sounding reference signal (SRS) resource sent by a network device, and determine at least one available SRS resource subset according to the subset constraint indication information; and the processor is configured to determine a length of an SRS resource indicator (SRI) according to a quantity of the at least one available SRS resource subset indicated by the subset constraint indication information, wherein each SRS resource subset in the at least one available SRS resource subset is one SRS resource combination, and the one SRS resource combination comprises at least one SRS resource;

wherein the processor is further configured to determine a target SRI from downlink control information (DCI) according to the length of the SRI;

the processor is further configured to determine a target SRS resource subset corresponding to the target SRI in the at least one available SRS resource subset; and the processor is further configured to determine a transmission parameter used for uplink data transmission according to the target SRS resource subset, wherein the processor is specifically configured to:

determine a corresponding relationship between a value of the SRI and the at least one available SRS resource subset according to the subset constraint indication information; and determine the target SRS resource subset corresponding to the target SRI from the at least one available SRS resource subset according to the corresponding relationship between the value of the SRI and the at least one available SRS resource subset.

9. The terminal device according to claim 8, wherein the processor is specifically configured to:

determine that the length of the SRI is equal to $\lceil \log_2 K \rceil$, wherein $\lceil \ \rceil$ represents upward rounding and K is equal to the quantity of the at least one available SRS resource subset.

10. The terminal device according to claim 8, wherein the transmission parameter used for the uplink data transmission comprises at least one of: a precoding matrix, a quantity of transmission layers, a quantity of antenna ports, a transmission beam, a power control parameter, or a panel.

11. The terminal device according to claim 10, wherein the processor is specifically configured to:

determine a total quantity of antenna ports of the target SRS resource subset or a quantity of SRS resources contained in the target SRS resource subset as a quantity of transmission layers of the uplink data transmission.

12. The terminal device according to claim 10, wherein the processor is specifically configured to:

determine a precoding matrix used for transmitting an SRS in the target SRS resource subset as a precoding matrix used for the uplink data transmission.

13. The terminal device according to claim 10, wherein the processor is specifically configured to:

determine a beam transmitting an SRS in the target SRS resource subset as a beam used for the uplink data transmission.

14. The terminal device according to claim 8, wherein the transmission parameter used for the uplink data transmission comprises a panel; and the processor is specifically configured to:

determine a panel that transmits an SRS in the target SRS resource subset as the panel used for the uplink data transmission.

* * * * *